United States Patent
Shimizu

(10) Patent No.: US 12,556,800 B2
(45) Date of Patent: Feb. 17, 2026

(54) CAMERA CONTROL APPARATUS, CONTROL METHOD, AND NON-TRANSITORY COMPUTER READABLE MEDIUM

(71) Applicant: NEC Corporation, Tokyo (JP)

(72) Inventor: Yuta Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 18/725,313

(22) PCT Filed: Mar. 22, 2022

(86) PCT No.: PCT/JP2022/013096
§ 371 (c)(1),
(2) Date: Jun. 28, 2024

(87) PCT Pub. No.: WO2023/181108
PCT Pub. Date: Sep. 28, 2023

(65) Prior Publication Data
US 2025/0063248 A1 Feb. 20, 2025

(51) Int. Cl.
*H04N 23/611* (2023.01)
*H04N 23/80* (2023.01)

(52) U.S. Cl.
CPC .......... *H04N 23/611* (2023.01); *H04N 23/80* (2023.01)

(58) Field of Classification Search
CPC ...... H04N 23/611; H04N 23/80; H04N 23/60; H04N 23/71; G03B 7/093; G03B 15/00
See application file for complete search history.

(56) References Cited

U.S. PATENT DOCUMENTS

2012/0300985 A1* 11/2012 Ito .................. H04L 9/3231
382/103
2023/0289418 A1* 9/2023 Yuki .................. G06V 40/172
(Continued)

FOREIGN PATENT DOCUMENTS

JP 2008-205774 A 9/2008
JP 2008-234619 A 10/2008
(Continued)

OTHER PUBLICATIONS

International Search Report for PCT Application No. PCT/JP2022/013096, mailed on Jun. 14, 2022.

*Primary Examiner* — Hung H Lam
(74) *Attorney, Agent, or Firm* — Sughrue Mion, PLLC

(57) ABSTRACT

An object of the present disclosure is to provide a camera control apparatus, a control method, and a non-transitory computer readable medium capable of bringing the state of an image into an optimum state for authentication in a shorter time even when the state of the image has changed rapidly. A camera control apparatus according to the present disclosure includes: area determination means for determining a part of a first image including an authentication target as a first area, the first image being obtained by capturing a nearby environment, determining a part of a second image including the authentication target as a second area, the second image being obtained by setting a control parameter of the camera control apparatus so that a state of an image of the authentication target becomes an optimum state for authentication of the authentication target and then capturing the nearby environment.

10 Claims, 3 Drawing Sheets

(56) References Cited

U.S. PATENT DOCUMENTS

2024/0371121 A1\* 11/2024 Funayama .............. G06V 40/18
2025/0071408 A1\* 2/2025 Shimizu ................. H04N 23/71
2025/0157260 A1\* 5/2025 Takahashi ............ A61B 5/1171

FOREIGN PATENT DOCUMENTS

| JP | 2009-064100 A | 3/2009 |
| JP | 2021-061458 A | 4/2021 |
| JP | 2021-150947 A | 9/2021 |

\* cited by examiner

CAMERA CONTROL APPARATUS, CONTROL METHOD, AND NON-TRANSITORY COMPUTER READABLE MEDIUM

This application is a National Stage Entry of PCT/JP2022/013096 filed on Mar. 22, 2022, the contents of all of which are incorporated herein by reference, in their entirety.

TECHNICAL FIELD

The present disclosure relates to a camera control apparatus, a control method, and a non-transitory computer readable medium, and in particular, to a camera control apparatus, a control method, and a non-transitory computer readable medium which are capable of bringing the state of an image into an optimum state for authentication in a shorter time even when the state of the image has changed rapidly.

BACKGROUND ART

Techniques for detecting, in order to perform face authentication, a face area including a face to be authenticated from an image captured by a camera or the like and controlling the state of the image quality of the captured image based on information related to the face area are known.

Patent Literature 1 discloses a technology related to an information processing apparatus comprising: acquisition means for acquiring a captured image; face detection means for detecting a face area from the image; human body detection means for detecting a human body area from the image when no face is detected by the face detection means; determination means for determining exposure based on luminance of the face area detected by the face detection means or the human body area detected by the human body detection means; and output means for outputting the exposure determined by the determination means, in which when a predetermined condition is satisfied, the determination means maintains the exposure until a face area is newly detected by the face detection means or a human body area is newly detected by the human body detection means. Patent Literature 1 does not disclose that exposure (a control parameter) is controlled based on a difference between the state of a target image and the state of the current image and a difference between the state of an image captured in the past and the state of the current image.

Patent Literature 2 discloses an information processing apparatus comprising: an image input unit that continuously inputs an image to be captured by a camera; a luminance change observation unit that observes a temporal change in luminance of each pixel of an image input by the image input unit; a face area detection unit that detects an area corresponding to a face part of a person from the image input by the image input unit; a classification processing unit that classifies an image into a target part of interest and a target part of no interest based on a result of the observation by the luminance change observation unit and a result of the detection by the face area detection unit; and a gain adjustment unit that adjusts a gain of the camera for the target part of interest shown in a result of the classification by the classification processing unit. That is, Patent Literature 2 discloses that, with regard to the target part of interest and the target part of no interest, a mask for increasing the weight of luminance information of the target of interest is created. Patent Literature 2 does not disclose that exposure (a control parameter) is controlled based on a difference between the state of a target image and the state of the current image and a difference between the state of an image captured in the past and the state of the current image.

CITATION LIST

Patent Literature

Patent Literature 1: Japanese Unexamined Patent Application Publication No. 2021-150947
Patent Literature 2: Japanese Unexamined Patent Application Publication No. 2009-064100

SUMMARY OF INVENTION

Technical Problem

When a control parameter of a camera is automatically controlled in order to capture an image suitable for face authentication, there is a problem that a large amount of time is required to control the state of the image to a state suitable for face authentication when the state of the image has changed rapidly. Further, when a control parameter of a camera is calculated using Artificial Intelligence (AI), there is a problem that the calculation cost of AI and the amount of processing time are large and thus a large amount of time is required to obtain a result of the face authentication.

An object of the present disclosure is to provide a camera control apparatus, a control method, and a non-transitory computer readable medium that solve the above-described problems.

Solution to Problem

A camera control apparatus according to the present disclosure includes:
  area determination means for determining a part of a first image including an authentication target as a first area, the first image being obtained by capturing a nearby environment, determining a part of a second image including the authentication target as a second area, the second image being obtained by setting a control parameter of the camera control apparatus so that a state of an image of the authentication target becomes an optimum state for authentication of the authentication target and then capturing the nearby environment, and determining a part of a third image including the authentication target as a third area, the third image being obtained by capturing the nearby environment before the first image is captured;
  first difference calculation means for calculating a first state difference, the first state difference being a difference between a second state indicating a state of the image of the second area and a first state indicating a state of the image of the first area;
  second difference calculation means for calculating a second state difference, the second state difference being a difference between a third state indicating a state of the image of the third area and the first state; and
  control information determination means for determining the control parameter so that a sum of the first state difference and the second state difference falls within a predetermined state difference range based on the first state difference and the second state difference.

A control method according to the present disclosure includes:

determining a part of a first image including an authentication target as a first area, the first image being obtained by capturing a nearby environment;

determining a part of a second image including the authentication target as a second area, the second image being obtained by setting a control parameter of a camera control apparatus so that a state of an image of the authentication target becomes an optimum state for authentication of the authentication target and then capturing the nearby environment;

determining a part of a third image including the authentication target as a third area, the third image being obtained by capturing the nearby environment before the first image is captured;

calculating a first state difference, the first state difference being a difference between a second state indicating a state of the image of the second area and a first state indicating a state of the image of the first area;

calculating a second state difference, the second state difference being a difference between a third state indicating a state of the image of the third area and the first state; and determining the control parameter so that a sum of the first state difference and the second state difference falls within a predetermined state difference range based on the first state difference and the second state difference.

A non-transitory computer readable medium according to the present disclosure stores a program for causing a computer to:

determine a part of a first image including an authentication target as a first area, the first image being obtained by capturing a nearby environment;

determine a part of a second image including the authentication target as a second area, the second image being obtained by setting a control parameter of a camera control apparatus so that a state of an image of the authentication target becomes an optimum state for authentication of the authentication target and then capturing the nearby environment;

determine a part of a third image including the authentication target as a third area, the third image being obtained by capturing the nearby environment before the first image is captured;

calculate a first state difference, the first state difference being a difference between a second state indicating a state of the image of the second area and a first state indicating a state of the image of the first area;

calculate a second state difference, the second state difference being a difference between a third state indicating a state of the image of the third area and the first state; and determine the control parameter so that a sum of the first state difference and the second state difference falls within a predetermined state difference range based on the first state difference and the second state difference.

Advantageous Effects of Invention

According to the present disclosure, it is possible to provide a camera control apparatus, a control method, and a non-transitory computer readable medium which are capable of bringing the state of an image into an optimum state for authentication in a shorter time even when the state of the image has changed rapidly.

EXAMPLE EMBODIMENT

Example embodiments of the present disclosure will be described below with reference to the drawings. The same or corresponding elements are denoted by the same reference symbols throughout the drawings, and redundant descriptions thereof will be omitted as necessary for the clarification of the description.

First Example Embodiment

Configuration

Figure 1:
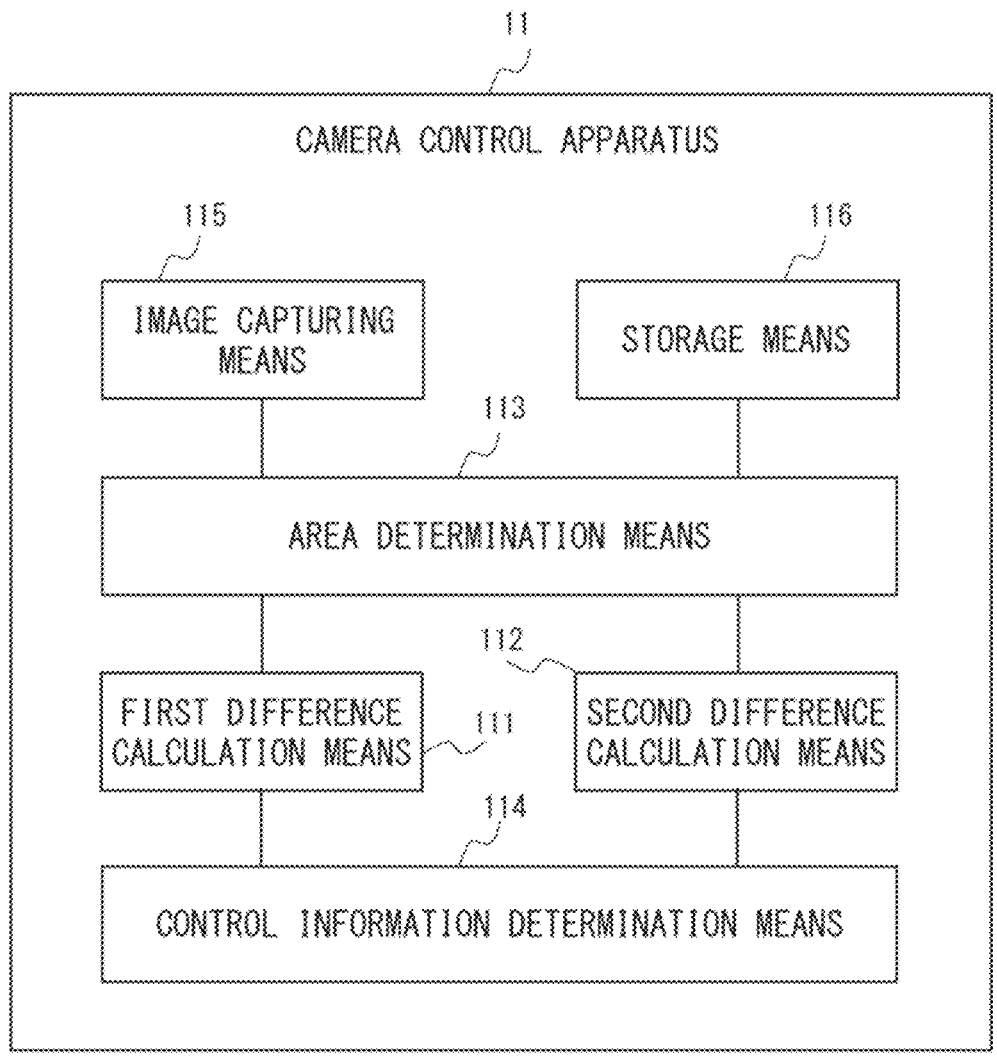
FIG. 1 is a block diagram showing an example of a camera control apparatus according to a first example embodiment.
Figure 2:
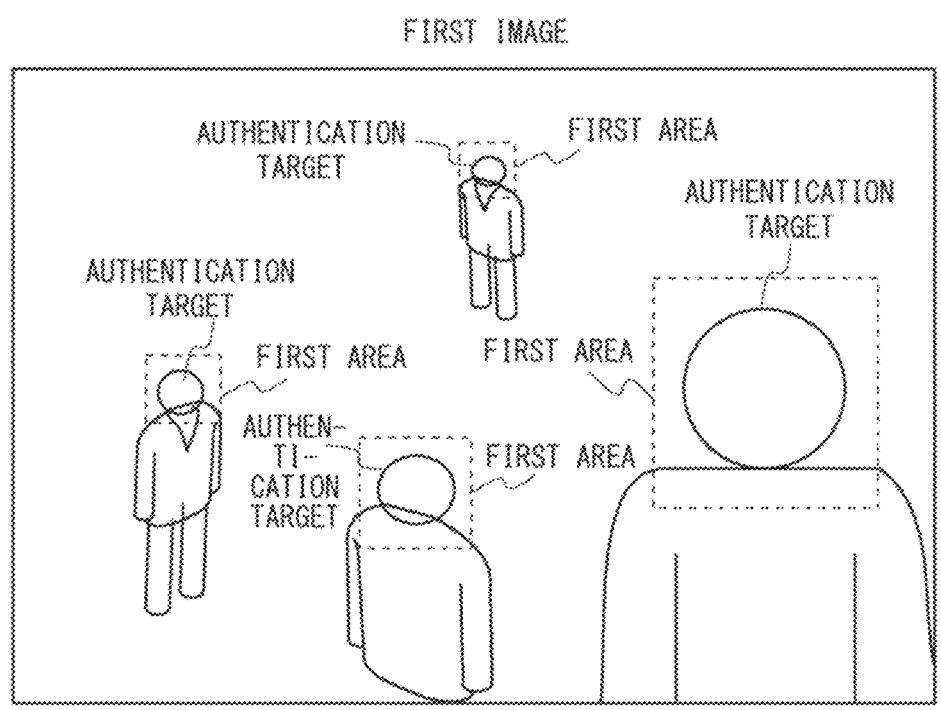
FIG. 2 is a schematic diagram showing an example of an image captured by image capturing means according to the first example embodiment.
Figure 3:
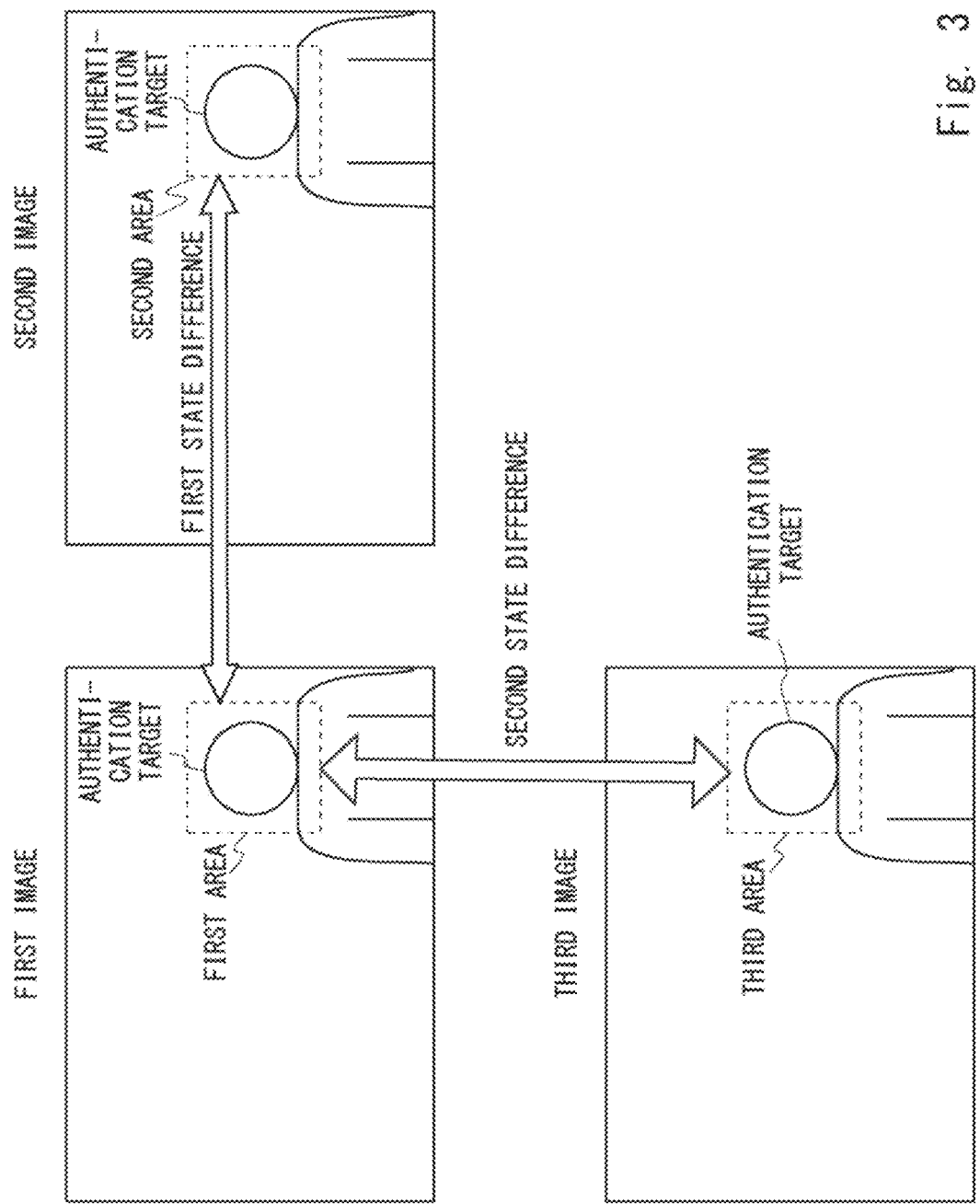
FIG. 3 is a schematic diagram showing an example of a relationship among a first image, a second image, and a third image according to the first example embodiment.

FIG. 1 is a block diagram showing an example of a camera control apparatus according to a first example embodiment. FIG. 2 is a schematic diagram showing an example of an image captured by image capturing means according to the first example embodiment. FIG. 3 is a schematic diagram showing an example of a relationship among a first image, a second image, and a third image according to the first example embodiment.

As shown in FIG. 1, a camera control apparatus 11 according to the first example embodiment includes first difference calculation means 111, second difference calculation means 112, area determination means 113, control information determination means 114, image capturing means 115, and storage means 116.

As shown in FIG. 2, the area determination means 113 determines a part of the first image including an authentication target as a first area, the first image being obtained by capturing a nearby environment. Although four authentication targets are shown as an example in FIG. 2, the number of authentication targets is not limited thereto. The number of authentication targets in the first example embodiment may be other than four. Further, the area determination means 113 determines a part of the second image including the authentication target as a second area, the second image being obtained by setting a control parameter of the camera control apparatus 11 so that a state of the image of the authentication target becomes an optimum state for authentication of the authentication target and then capturing the nearby environment. Further, the area determination means 113 determines a part of the third image including the authentication target as a third area, the third image being obtained by capturing the nearby environment before the first image is captured. Note that the first area and/or the third area including the authentication target may be referred to as an area(s) of interest.

The second image may be an image generated by capturing the nearby environment in a state in which the control parameter is set in advance so that the state of the image of the authentication target becomes an optimum state for authentication of the authentication target. However, the second image is not limited thereto. The second image may be generated by capturing an environment different from the nearby environment in a state in which the control parameter is set so that the state of the image of the authentication target becomes an optimum state for authentication of the authentication target. Note that the second area, which is a part of the second image including the authentication target, may be referred to as an area that is a target (a target area). Further, the second image may be referred to as an image that is a target (a target image).

The third image obtained by capturing a nearby environment before the first image is captured may be referred to as an image of the adjacent frame. Further, the control parameter may be referred to as a parameter or control information.

The "state of the image" of each of the first image, the second image, and the third image indicates at least one of an average value of luminance values of the image, dispersion in the luminance values, a standard deviation of the luminance values, and a histogram of the luminance values. Note that the average of the luminance values of the entire image may be referred to as an average luminance value, the dispersion in the luminance values of the entire image may be referred to as a luminance dispersion value, the standard deviation of the luminance values of the entire image may be referred to as a luminance standard deviation, and the histogram of the luminance values of the entire image may be referred to as a luminance histogram.

The image capturing means 115 captures the first image, the second image, and the third image. The storage means 116 stores the first image, the third image, and the state of the image of the authentication target in the second image (the state of the image generated from the second image).

The control parameter includes at least one of an exposure time, a sensitivity, and a contrast. The exposure refers to the amount of light captured when an image is captured. The sensitivity, which is an index of how much light that has entered the image capturing means 115 is amplified in the image capturing means 115, may be referred to as a gain. The contrast refers to a difference between lightness in a light area and that in a dark area of an image (a photograph). When the aforementioned difference is large, it may be said that the image has a high contrast. As the contrast becomes higher, the light area becomes lighter and the dark area becomes darker, and as a result, the color of the image becomes more sharply defined.

The camera control apparatus 11 controls (adjusts) an exposure time, a sensitivity, a contrast, and the like based on control parameters input to the image capturing means 115.

As shown in FIGS. 1 and 3, the first difference calculation means 111 calculates a first state difference which is a difference between a second state indicating a state of the image of the second area and a first state indicating a state of the image of the first area. The second difference calculation means 112 calculates a second state difference which is a difference between a third state indicating a state of the image of the third area and the first state indicating the state of the image of the first area.

The control information determination means 114 determines the control parameter so that a sum of the first state difference and the second state difference falls within a predetermined state difference range based on the first state difference and the second state difference.

Effect

In the following description, it is assumed that a case is one in which only the first state difference is used and the second state difference is ignored in order to make the description simple. In this case, the control information determination means 114 determines a control parameter so that a difference between the state of the image of the target area and the state of the image of the current area falls within a predetermined state difference range. Specifically, it is assumed that a case is one in which the state of the image is a luminance value and a vehicle including the camera control apparatus 11 mounted thereon exits a tunnel. In this case, the control information determination means 114 determines a control parameter based on the first state difference between the target luminance value and the current luminance value. The control information determination means 114 determines a control parameter by which the farther the current luminance value is from the target luminance value, the larger the correction value becomes. As a result, the camera control apparatus 11 can quickly make the current luminance value converge to the target luminance value, and thus quickly bring the state of the image into a state suitable for authentication of the authentication target. As a result, the camera control apparatus 11 can capture an image of the authentication target in an optimum state for authentication of the authentication target, and thus can acquire the optimum image.

As described above, according to the first example embodiment, it is possible to provide a camera control apparatus, a control method, and a non-transitory computer readable medium which are capable of bringing the state of an image into an optimum state for authentication in a shorter time even when the state of the image has changed rapidly.

Further, in the first example embodiment, the amount of calculation can be reduced so that it is less than that in a case in which AI is used, and thus the processing time can be reduced.

Note that the control information determination means 114 may use the total sum of the product of the first state difference and a first coefficient and the product of the second state difference and a second coefficient instead of the sum of the first state difference and the second state difference, and determine the control parameter so that the total sum falls within a predetermined state difference range.

Second Example Embodiment

A second example embodiment differs from the first example embodiment in that an authentication target is limited to "the face of a person".

That is, the area determination means 113 determines a part of the first image including the face of a person as the first area, the first image being obtained by capturing a nearby environment. Further, the area determination means 113 determines a part of the second image including the face of a person as the second area, the second image being obtained by setting a control parameter of the camera control apparatus 11 so that a state of the image of the face of the person becomes an optimum state for authentication of the face of the person and then capturing the nearby environment. Further, the area determination means 113 determines a part of the third image including the face of a person as the third area, the third image being obtained by capturing the nearby environment before the first image is captured.

The first difference calculation means 111 calculates a first state difference which is a difference between a second state indicating a state of the image of the second area and a first state indicating a state of the image of the first area.

The second difference calculation means 112 calculates a second state difference which is a difference between a third state indicating a state of the image of the third area and the first state.

The control information determination means 114 determines the control parameter so that a sum of the first state difference and the second state difference falls within a predetermined state difference range based on the first state difference and the second state difference.

The camera control apparatus 11 according to the second example embodiment determines a control parameter to be input to the image capturing means (camera etc.) based on the difference (the first state difference) between the state of the image suitable for face authentication (the target image) and the state of the current image, and the difference (the second state difference) between the state of the past image (the adjacent frame) and the state of the current image.

Thus, the camera control apparatus 11 provides a correction value by the control parameter in such a manner that the farther the state of the image is from the target value, the larger the correction value becomes. As a result, the convergence to the target luminance value becomes faster than that when the control parameter is input as a fixed value, and thus the state of the image can be quickly made suitable for face authentication.

Note that, although the present disclosure has been described as a hardware configuration in the above example embodiments, the present disclosure is not limited thereto. In the present disclosure, processing of each component may also be implemented by causing a Central Processing Unit (CPU) to execute a computer program.

In the above example embodiments, the program can be stored and provided to a computer using any type of non-transitory computer readable media. Non-transitory computer readable media include any type of tangible storage media. Examples of non-transitory computer readable media include magnetic storage media (specifically, a flexible disk, a magnetic tape, and a hard disk drive), optical magnetic storage media (specifically, a magneto-optical disk), a CD-ROM (Read Only Memory), a CD-R, a CD-R/W, and semiconductor memories (specifically, a mask ROM, a PROM (Programmable ROM), an EPROM (Erasable PROM), a flash ROM, and an RAM (Random Access Memory)). The program may be provided to a computer using any type of transitory computer readable media. Examples of transitory computer readable media include an electric signal, an optical signal, and an electromagnetic wave. Transitory computer readable media can provide the program to a computer via a wired communication line (e.g., electric wires, and optical fibers) or a wireless communication line.

Although the present disclosure has been described above with reference to example embodiments, the present disclosure is not limited to the above-described example embodiments. Various changes that can be understood by those skilled in the art can be made to the configuration and the details of the present disclosure within the scope of the invention.

Note that the present disclosure is not limited to the above-described example embodiments and may be changed as appropriate without departing from the scope and spirit of the present disclosure.

The whole or part of the example embodiments disclosed above can be described as, but not limited to, the following supplementary notes.

(Supplementary Note 1)

A camera control apparatus comprising:

area determination means for determining a part of a first image including an authentication target as a first area, the first image being obtained by capturing a nearby environment, determining a part of a second image including the authentication target as a second area, the second image being obtained by setting a control parameter of the camera control apparatus so that a state of an image of the authentication target becomes an optimum state for authentication of the authentication target and then capturing the nearby environment, and determining a part of a third image including the authentication target as a third area, the third image being obtained by capturing the nearby environment before the first image is captured;

first difference calculation means for calculating a first state difference, the first state difference being a difference between a second state indicating a state of the image of the second area and a first state indicating a state of the image of the first area;

second difference calculation means for calculating a second state difference, the second state difference being a difference between a third state indicating a state of the image of the third area and the first state; and control information determination means for determining the control parameter so that a sum of the first state difference and the second state difference falls within a predetermined state difference range based on the first state difference and the second state difference.

(Supplementary Note 2)

The camera control apparatus according to supplementary note 1, wherein the second image is generated by capturing the nearby environment in a state in which the control parameter is set in advance so that the state of the image of the authentication target becomes an optimum state for authentication of the authentication target.

(Supplementary Note 3)

The camera control apparatus according to supplementary note 1 or 2, wherein the state of the image includes at least one of an average value of luminance values of the image, dispersion in the luminance values, a standard deviation of the luminance values, and a histogram of the luminance values.

(Supplementary Note 4)

The camera control apparatus according to supplementary note 3, further comprising storage means for storing the first image, the third image, and the state of the image of the authentication target in the second image.

(Supplementary Note 5)

The camera control apparatus according to any one of supplementary notes 1 to 4, wherein the control parameter includes at least one of an exposure time, a sensitivity, and a contrast.

(Supplementary Note 6)

The camera control apparatus according to any one of supplementary notes 1 to 5, wherein the control information determination means uses a total sum of a product of the first state difference and a first coefficient and a product of the second state difference and a second coefficient instead of a sum of the first state difference and the second state difference, and the control information determination means determines the control parameter so that the total sum falls within a predetermined state difference range.

(Supplementary Note 7)

The camera control apparatus according to any one of supplementary notes 1 to 6, further comprising image capturing means for capturing the first image, the second image, and the third image.

(Supplementary Note 8)

The camera control apparatus according to any one of supplementary notes 1 to 7, wherein the authentication target is limited to a face of a person.

(Supplementary Note 9)

A control method comprising:
determining a part of a first image including an authentication target as a first area, the first image being obtained by capturing a nearby environment;
determining a part of a second image including the authentication target as a second area, the second image being obtained by setting a control parameter of a camera control apparatus so that a state of an image of the authentication target becomes an optimum state for authentication of the authentication target and then capturing the nearby environment;
determining a part of a third image including the authentication target as a third area, the third image being obtained by capturing the nearby environment before the first image is captured;
calculating a first state difference, the first state difference being a difference between a second state indicating a state of the image of the second area and a first state indicating a state of the image of the first area;
calculating a second state difference, the second state difference being a difference between a third state indicating a state of the image of the third area and the first state; and
determining the control parameter so that a sum of the first state difference and the second state difference falls within a predetermined state difference range based on the first state difference and the second state difference.

(Supplementary Note 10)

A non-transitory computer readable medium storing a program for causing a computer to:
determine a part of a first image including an authentication target as a first area, the first image being obtained by capturing a nearby environment;
determine a part of a second image including the authentication target as a second area, the second image being obtained by setting a control parameter of a camera control apparatus so that a state of an image of the authentication target becomes an optimum state for authentication of the authentication target and then capturing the nearby environment;
determine a part of a third image including the authentication target as a third area, the third image being obtained by capturing the nearby environment before the first image is captured;
calculate a first state difference, the first state difference being a difference between a second state indicating a state of the image of the second area and a first state indicating a state of the image of the first area;
calculate a second state difference, the second state difference being a difference between a third state indicating a state of the image of the third area and the first state; and
determine the control parameter so that a sum of the first state difference and the second state difference falls within a predetermined state difference range based on the first state difference and the second state difference.

REFERENCE SIGNS LIST

11: CAMERA CONTROL APPARATUS
111: FIRST DIFFERENCE CALCULATION MEANS
112: SECOND DIFFERENCE CALCULATION MEANS
113: AREA DETERMINATION MEANS
114: CONTROL INFORMATION DETERMINATION MEANS
115: IMAGE CAPTURING MEANS
116: STORAGE MEANS

What is claimed is:

1. A camera control apparatus comprising:
at least one memory storing instructions, and
at least one processor configured to execute the instructions to;
determine a part of a first image including an authentication target as a first area, the first image being obtained by capturing a nearby environment, determine a part of a second image including the authentication target as a second area, the second image being obtained by setting a control parameter of the camera control apparatus so that a state of an image of the authentication target becomes an optimum state for authentication of the authentication target and then capture the nearby environment, and determining a part of a third image including the authentication target as a third area, the third image being obtained by capturing the nearby environment before the first image is captured;
calculate a first state difference, the first state difference being a difference between a second state indicating a state of the image of the second area and a first state indicating a state of the image of the first area;
calculate a second state difference, the second state difference being a difference between a third state indicating a state of the image of the third area and the first state; and
determine the control parameter so that a sum of the first state difference and the second state difference falls within a predetermined state difference range based on the first state difference and the second state difference.

2. The camera control apparatus according to claim 1, wherein the second image is generated by capturing the nearby environment in a state in which the control parameter is set in advance so that the state of the image of the authentication target becomes an optimum state for authentication of the authentication target.

3. The camera control apparatus according to claim 1, wherein the state of the image includes at least one of an average value of luminance values of the image, dispersion in the luminance values, a standard deviation of the luminance values, and a histogram of the luminance values.

4. The camera control apparatus according to claim 3, the at least one memory further storing the first image, the third image, and the state of the image of the authentication target in the second image.

5. The camera control apparatus according to claim 1, wherein the control parameter includes at least one of an exposure time, a sensitivity, and a contrast.

6. The camera control apparatus according to claim 1, wherein
the at least one processor configured to execute the instructions to:
use a total sum of a product of the first state difference and a first coefficient and a product of the second state difference and a second coefficient instead of a sum of the first state difference and the second state difference, and
determine the control parameter so that the total sum falls within a predetermined state difference range.

7. The camera control apparatus according to claim 1, further comprising a camera for capturing the first image, the second image, and the third image.

8. The camera control apparatus according to claim 1, wherein the authentication target is limited to a face of a person.

9. A control method comprising:
determining a part of a first image including an authentication target as a first area, the first image being obtained by capturing a nearby environment;
determining a part of a second image including the authentication target as a second area, the second image being obtained by setting a control parameter of a camera control apparatus so that a state of an image of the authentication target becomes an optimum state for authentication of the authentication target and then capturing the nearby environment;
determining a part of a third image including the authentication target as a third area, the third image being obtained by capturing the nearby environment before the first image is captured;
calculating a first state difference, the first state difference being a difference between a second state indicating a state of the image of the second area and a first state indicating a state of the image of the first area;
calculating a second state difference, the second state difference being a difference between a third state indicating a state of the image of the third area and the first state; and
determining the control parameter so that a sum of the first state difference and the second state difference falls within a predetermined state difference range based on the first state difference and the second state difference.

10. A non-transitory computer readable medium storing a program for causing a computer to:
determine a part of a first image including an authentication target as a first area, the first image being obtained by capturing a nearby environment;
determine a part of a second image including the authentication target as a second area, the second image being obtained by setting a control parameter of a camera control apparatus so that a state of an image of the authentication target becomes an optimum state for authentication of the authentication target and then capturing the nearby environment;
determine a part of a third image including the authentication target as a third area, the third image being obtained by capturing the nearby environment before the first image is captured;
calculate a first state difference, the first state difference being a difference between a second state indicating a state of the image of the second area and a first state indicating a state of the image of the first area;
calculate a second state difference, the second state difference being a difference between a third state indicating a state of the image of the third area and the first state; and
determine the control parameter so that a sum of the first state difference and the second state difference falls within a predetermined state difference range based on the first state difference and the second state difference.

* * * * *